(12) United States Patent
Nguyen et al.

(10) Patent No.: US 10,780,630 B2
(45) Date of Patent: Sep. 22, 2020

(54) USE OF A THERMOSETTING POLYMERIC POWDER COMPOSITION

(71) Applicant: TIGER COATINGS GMBH & CO. KG, Wels (AT)

(72) Inventors: Le-Huong Nguyen, Wels (AT); Carsten Herzhoff, Wels (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 267 days.

(21) Appl. No.: 15/758,583

(22) PCT Filed: Sep. 14, 2016

(86) PCT No.: PCT/EP2016/071649
§ 371 (c)(1),
(2) Date: Mar. 8, 2018

(87) PCT Pub. No.: WO2017/046132
PCT Pub. Date: Mar. 23, 2017

(65) Prior Publication Data
US 2018/0243978 A1    Aug. 30, 2018

(30) Foreign Application Priority Data

Sep. 14, 2015    (EP) .................................... 15185041

(51) Int. Cl.
*C08J 3/24*    (2006.01)
*B29C 64/153*    (2017.01)
(Continued)

(52) U.S. Cl.
CPC ............ *B29C 64/153* (2017.08); *B33Y 10/00* (2014.12); *B33Y 70/00* (2014.12); *C08J 3/244* (2013.01);
(Continued)

(58) Field of Classification Search
CPC .............. B29C 64/153; B29K 2063/00; B29K 2101/10; B29K 2105/251; B33Y 10/00;
(Continued)

(56) References Cited

U.S. PATENT DOCUMENTS

| 4,863,538 A | 9/1989 | Deckard |
| 4,994,817 A | 2/1991 | Munson et al. |

(Continued)

FOREIGN PATENT DOCUMENTS

| CN | 1785555 | 6/2006 |
| CN | 1850493 | 10/2006 |

(Continued)

OTHER PUBLICATIONS

Office Action Issued in Corresponding Chinese Patent Application No. 2018513475, dated Jul. 23, 2019. (English Translation Provided).

(Continued)

*Primary Examiner* — Leo B Tentoni
(74) *Attorney, Agent, or Firm* — Norton Rose Fulbright US LLP

(57) ABSTRACT

The present invention relates to the use of a thermosetting polymeric powder composition in a Selective Laser Sintering process to produce a 3D duroplast, wherein the composition comprises at least one curable polymeric binder material and wherein during each pass of the SLS process said polymeric binder material is at least partially cured within the layer thus formed and also at least partially crosslinked with the previous layer. The invention furthermore relates to a SLS process using such a thermosetting polymeric powder composition and a 3D-printing product obtained when using such a thermosetting polymeric powder composition.

17 Claims, 8 Drawing Sheets

An example for interlayer-crosslinking of the powder during SLS

(51) Int. Cl.
*B33Y 70/00* (2020.01)
*B33Y 10/00* (2015.01)
*B29K 67/00* (2006.01)
*B29K 263/00* (2006.01)
*B29K 105/00* (2006.01)
*B29K 101/10* (2006.01)
*B29K 63/00* (2006.01)

(52) U.S. Cl.
CPC ........... *C08J 3/246* (2013.01); *B29K 2063/00* (2013.01); *B29K 2067/00* (2013.01); *B29K 2101/10* (2013.01); *B29K 2105/251* (2013.01); *B29K 2263/00* (2013.01); *C08J 2300/24* (2013.01); *C08J 2333/02* (2013.01); *C08J 2363/00* (2013.01); *C08J 2367/02* (2013.01)

(58) Field of Classification Search
CPC ..... C08J 3/24; C08J 3/244; C08J 3/246; C08J 2300/24; C08J 2363/00
USPC .......................................................... 264/497
See application file for complete search history.

(56) References Cited

U.S. PATENT DOCUMENTS

| | | | |
|---|---|---|---|
| 5,017,753 | A | 5/1991 | Deckard |
| 5,296,062 | A | 3/1994 | Bourell et al. |
| 6,136,948 | A | 10/2000 | Dickens, Jr. et al. |
| 8,124,686 | B2 | 2/2012 | Loyen et al. |
| 8,247,492 | B2 | 8/2012 | Martinoni |
| 8,592,519 | B2 | 11/2013 | Martinoni |
| 2004/0081573 | A1 | 4/2004 | Newell |
| 2004/0175686 | A1* | 9/2004 | Ono ................ B29C 64/153 434/274 |
| 2004/0226405 | A1 | 11/2004 | Geving et al. |
| 2007/0126159 | A1 | 6/2007 | Simon et al. |
| 2007/0241482 | A1 | 10/2007 | Giller et al. |
| 2013/0056672 | A1 | 3/2013 | Johnston et al. |
| 2014/0121327 | A1 | 5/2014 | Schmidt et al. |
| 2014/0319734 | A1* | 10/2014 | Voit ................ B29C 64/135 264/497 X |
| 2017/0283655 | A1* | 10/2017 | Kenney ................ B33Y 10/00 |
| 2018/0186076 | A1* | 7/2018 | Backer ................ B29C 64/153 |

FOREIGN PATENT DOCUMENTS

| | | |
|---|---|---|
| CN | 102325645 | 1/2012 |
| CN | 104647760 | 5/2015 |
| DE | 197 47 309 | 4/1999 |
| DE | 101 22 492 | 11/2002 |
| EP | 0 911 142 | 4/1999 |
| EP | 0 968 080 | 6/2002 |
| JP | 2007/277546 | 10/2007 |
| JP | 2009/013395 | 1/2009 |
| JP | 20080107369 | 1/2009 |
| JP | 2009031395 | 2/2009 |
| JP | 2010509459 | 3/2010 |
| JP | 2010/520949 | 6/2010 |
| RU | 151056 | 3/2015 |
| WO | WO 1996/06881 | 3/1996 |
| WO | WO 2003/106146 | 12/2003 |
| WO | WO 2007/114895 | 10/2007 |
| WO | WO 2008/057844 | 5/2008 |

OTHER PUBLICATIONS

Office Action Issued in Corresponding Chinese Application No. 201680053180.7, dated Jun. 5, 2019.
Abhinandan et al., "Laser curing of thermosetting powder coatings," *Proc. SPIE, Novel and Applications of Lasers and Pulsed Power,* 2374:26-33, (1995).
Abhinandan et al., "Laser curing of thermosetting powder coatings: A detailed investigation," *Journal of Laser Applications,* 11(6):248-257, (1999).
Compton et al., "3D-Printing of Lightweight Cellular Composites," *Advanced Materials,* 34:5930-5935, (2014).
Database WPI Week 200912, Thomas Scientific, XP-002754724, (2009).
Extended European Search Report issued in European Patent Application No. 15185041, dated Feb. 24, 2016.
International Search Report and Written Opinion issued in International Application No. PCT/EP2016/071649, dated Jan. 11, 2017.
Simone, "An experimental investigation on the laser cure of thermosetting powder: An empirical model for the local coating," *Progress in Organic Coatings,* 68:340-346, (2010).
Office Action issued in Corresponding Russian Patent Application No. 2018110304/05, dated Jan. 24, 2019.
Office Action issued in Corresponding Canadian Patent Application No. 2,998,668, dated Apr. 15, 2019
Office Action issued in Corresponding Japanese Application No. 2018-513475, dated Mar. 31, 2020 (English Translation Provided).

* cited by examiner

Fig. 1 An example for interlayer-crosslinking of the powder during SLS
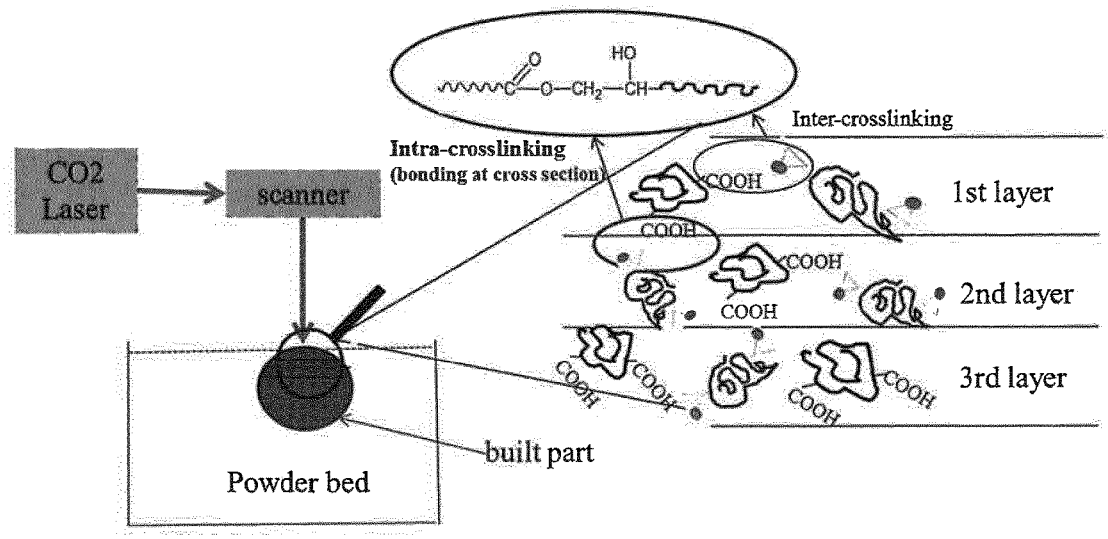
Fig. 2 An example of crosslinking network caused by the reaction between epoxy resin with amine
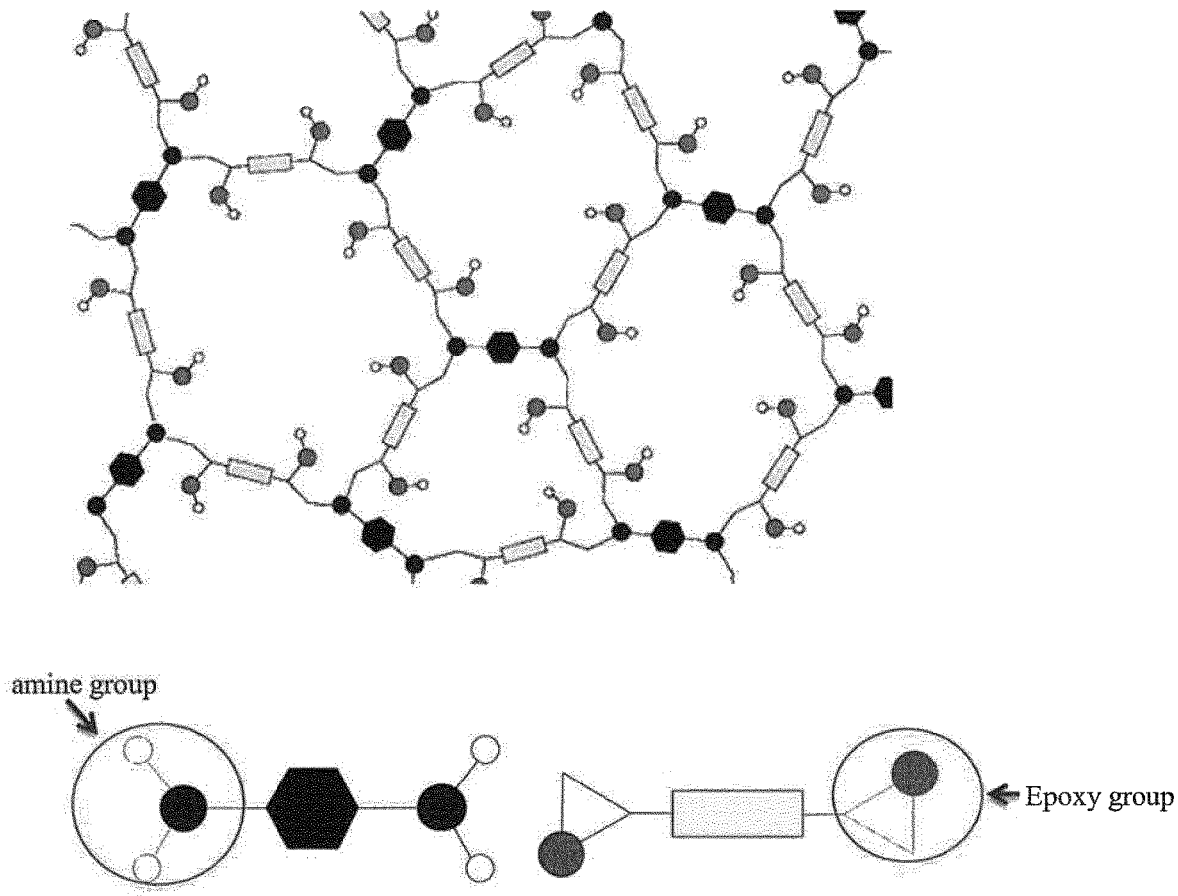

Fig. 3 Chemical structure of bisphenol A epoxy resin
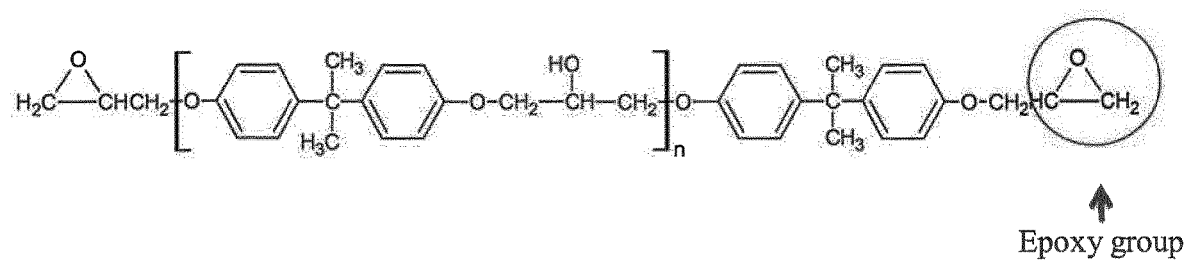
Epoxy group
Fig. 3a Epoxy resin cured with amine
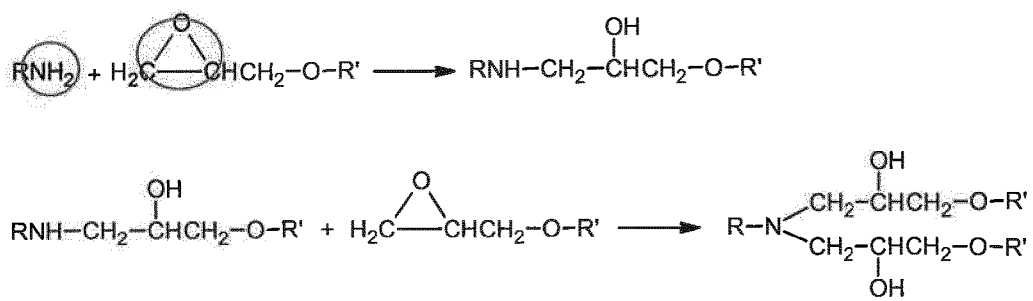
Fig. 3b Epoxy resin cured with acid anhydride
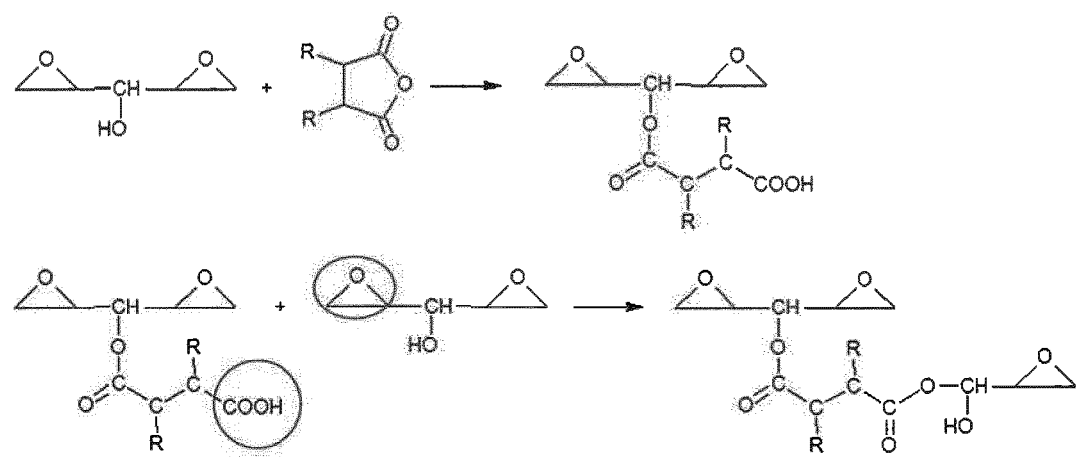

Fig. 4 Functional polyester resins
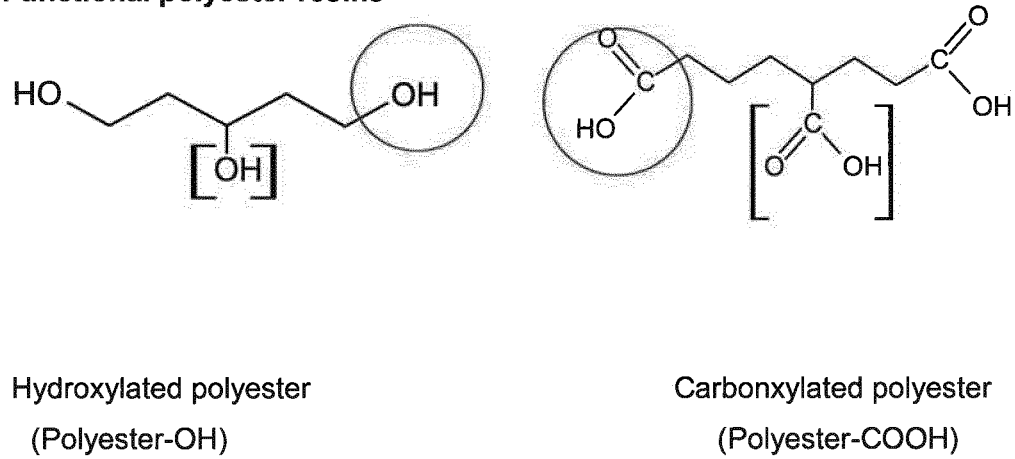
Hydroxylated polyester
(Polyester-OH)
Carbonxylated polyester
(Polyester-COOH)
Fig.4a Carboxylated Polyester (PE) cured with TGIC
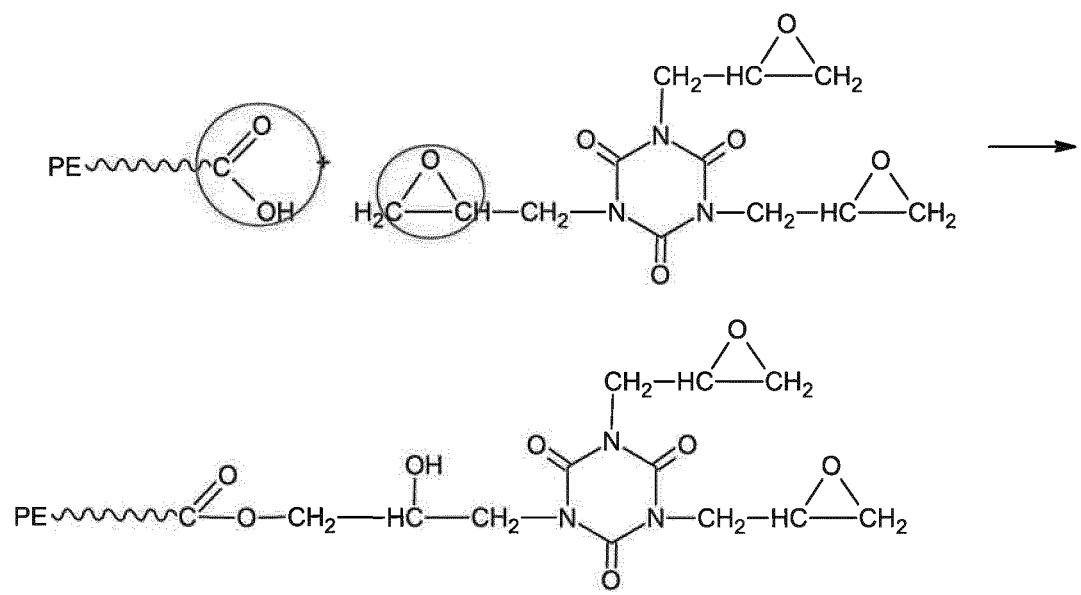

Fig.4b Carboxylated polyester cured with Hydroxyalkylamide
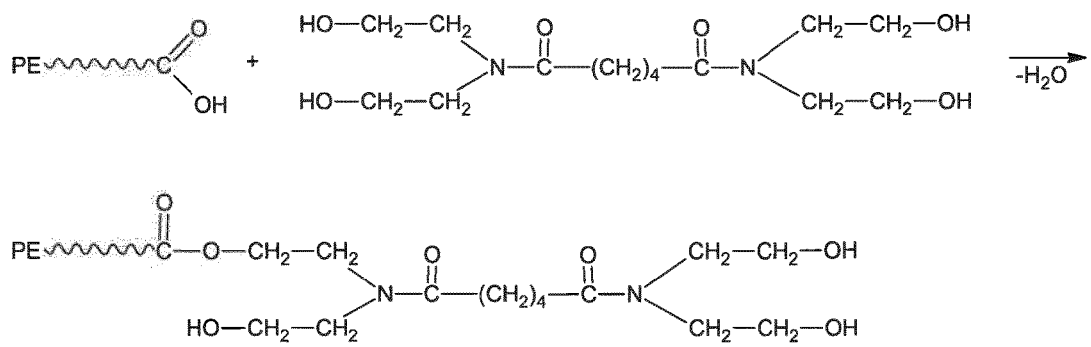
Fig.4c Carboxylated polyester cured with Glycidylester
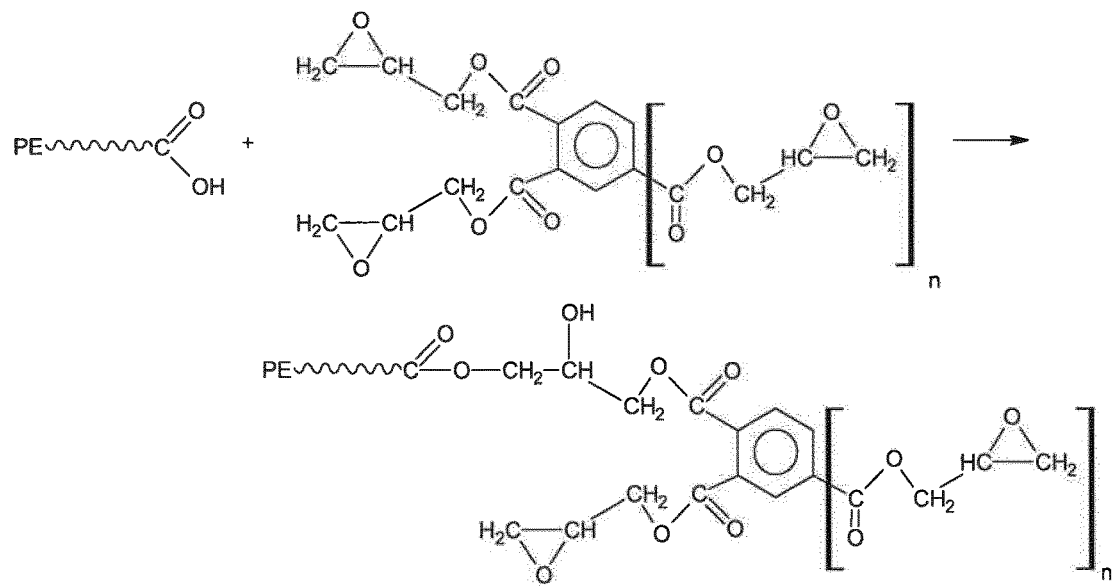

Fig. 4d Carboxylated polyester crosslinked with Epoxy resin (Hybrid system)
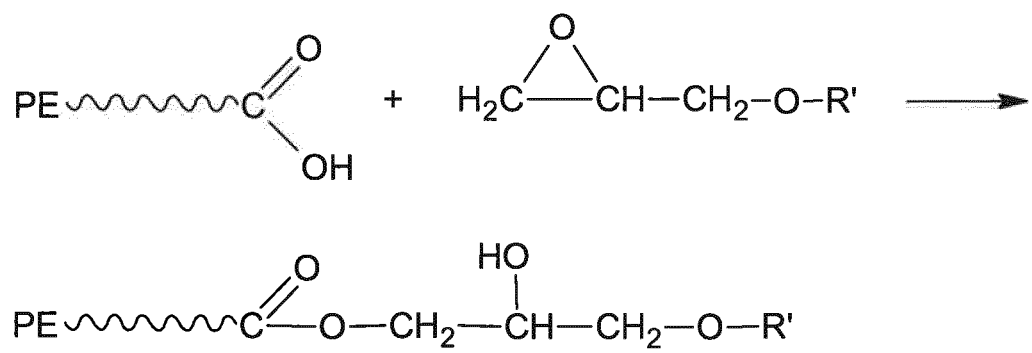
Fig. 4e Hydroxylated Polyester cured with Isocyanate aduct
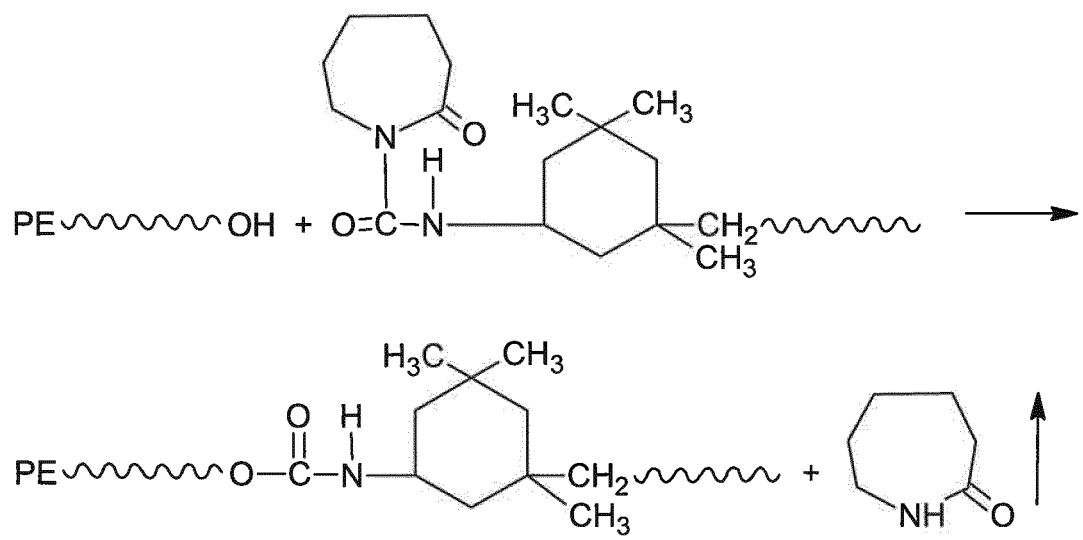

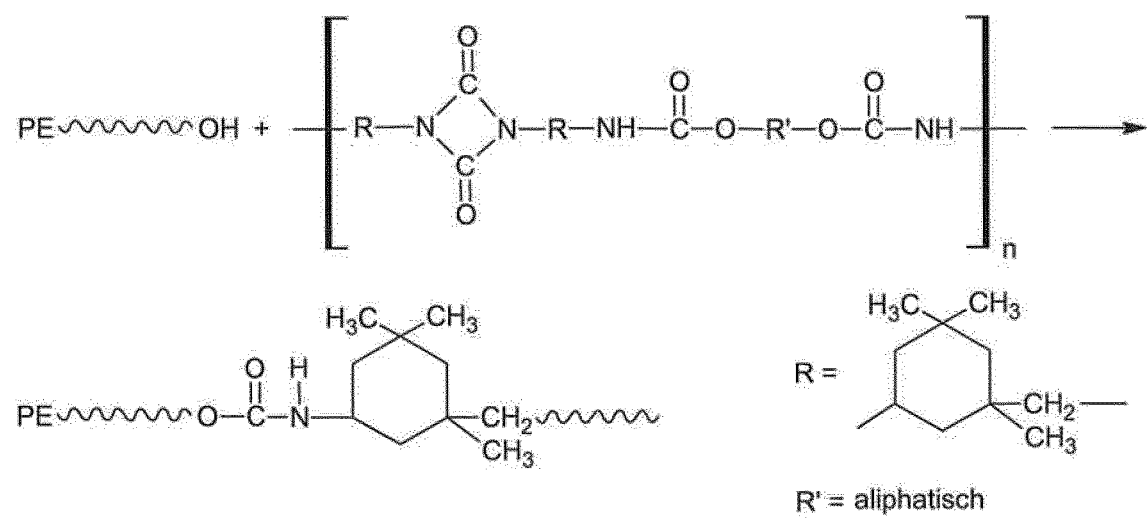
Fig.4 f Hydroxylated Polyester cured with Polyisocyanate (Polyuretdione)

Fig.5 GMA –Acrylate resin
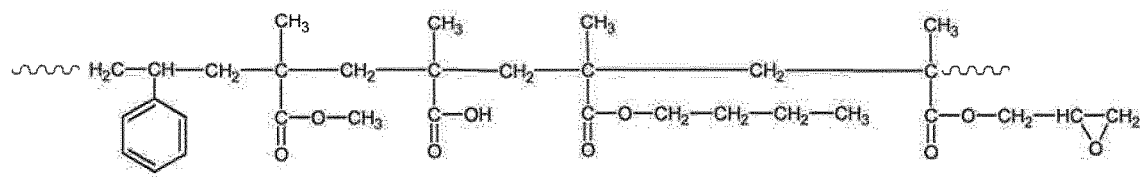
Fig.5a GMA-Acrylate resin cured with dicarbonxylated acid
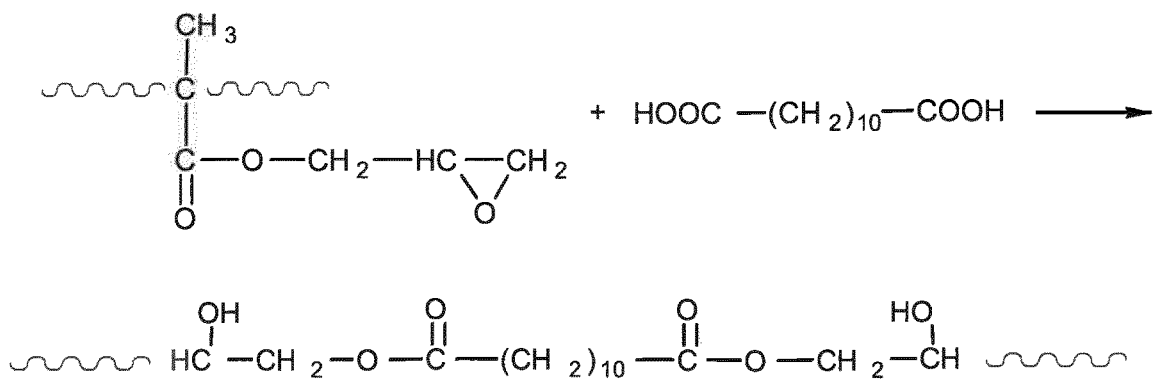
Fig.6 3D part produced from thermosetting powder
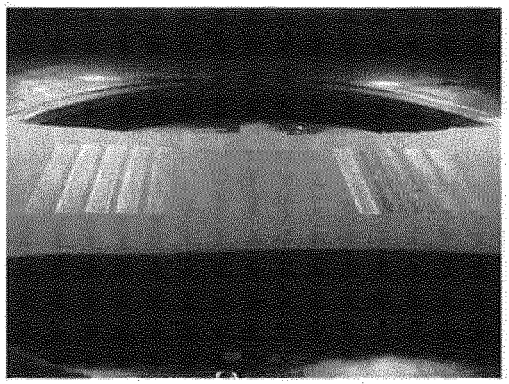

Fig.7: 3D parts produced with 3 different conditions
(a) Part produced with energy density of 25,2 kJ/m2: laser power 16W, 2 scan counts, scanning speed 5000 mm/s
(b) Part produced with higher energy density of 31,5 kJ/m2: laser power 10W, 2 scan counts, scanning speed 2500 mm/s
(c) Part produced with energy density of 31,5 kJ/m2: laser power 10W, 4 scan counts, scanning speed 5000 mm/s
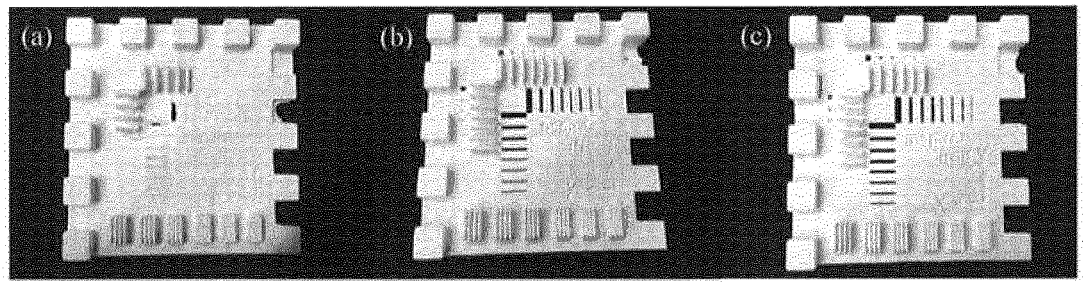

USE OF A THERMOSETTING POLYMERIC POWDER COMPOSITION

CROSS-REFERENCE TO RELATED APPLICATIONS

This application is a national phase application under 35 U.S.C. § 371 of International Application No. PCT/EP2016/071649 filed 14 Sep. 2016, which claims priority to European Patent Application No. 15185041.9 filed 14 Sep. 2015. The entire contents of each of the above-referenced disclosures is specifically incorporated by reference herein without disclaimer.

The present invention relates to the field of rapid prototyping (e.g. 3D Printing), and is particularly directed to the development of polymeric materials for producing functional parts, prototypes, models or tools by way of Selective Laser Sintering (referred to as SLS herein).

In almost any field of Mechanical engineering there is an existing need for the rapid production of prototypes. Laser Sintering, as it is already known in the state of the art, is the widespread rapid prototyping technology enabling the direct manufacture of three-dimensional articles of high resolution and dimensional accuracy from a variety of powdered materials, including conventional polymer powders. Prototypes or even production parts may be efficiently and economically produced by this process, which is often referred to as Selective Laser Sintering (SLS®, DTM Corporation, Austin, Tex.).

SLS was developed in the mid 1980's by Carl Deckard and Joseph Beaman in the Mechanical Engineering Department at the University of Texas. SLS is a powder based 3D model fabrication method using a high power laser, e.g. $CO_2$ or Nd:YAG, to sinter polymer powders to generate a 3D model. In the SLS process, a first layer of powder is deposited evenly onto a stage by a roller, and is then heated to a temperature just below the powder's melting point. Then, a laser beam is selectively scanned over the powder to raise the local temperature to the powder's melting point to fuse the single powder particles together. After the first layer is thereby completed, a second layer of powder is added, leveled, and again sintered in the desired areas. These steps are repeated to create a 3D model.

Detailed description of SLS technology may be found in U.S. Pat. Nos. 4,863,538 A, 5,017,753 A and 4,994,817 A. Furthermore, U.S. Pat. No. 5,296,062 A describes a method and apparatus for selectively sintering a layer of powder to produce a part comprising a plurality of sintered layers.

Meanwhile, various powders have been developed for use in this technology. Reference is made in this respect, for instance, to DE 101 22 492 A1, EP 0 968 080 A1, WO 03/106146 A1, or DE 197 47 309 A1.

U.S. Pat. No. 6,136,948 A and WO 96/06881 A provide detailed description of laser sintering process for producing moldings from powdered polymers. A wide variety of thermoplastic polymers and copolymers is disclosed in those documents, e.g. polyacetate, polypropylene, polyethylene and polyamide.

Polyamide-12 (PA 12) powder has proven particularly successful in industry for SLS to produce moldings, in particular to produce engineering components. The parts manufactured from PA12 powder meet the high requirements demanded with regards to mechanical loading. EP 0 911 142 A1 describes the use of PA 12 powder for producing moldings by SLS. U.S. Pat. No. 8,124,686 B describes the process to prepare the PA 12 powder suitable for SLS.

US 2007/0126159 A1 relates to the use of thermoplastic polyester powder in a shaping process, and moldings produced from this polyester powder.

U.S. Pat. No. 8,247,492 B2 and U.S. Pat. No. 8,592,519 B2 provide thermoplastic polyester powder compositions reinforced with fibers that are useful in laser sintering. The documents also relate to the method of manufacturing articles from such powder compositions.

A particular disadvantage of the use of semi-crystalline thermoplastics, e.g. PA 12, is that it leads to shrinkage problems, therefore it is complicate to produce accurate parts. In another aspect, the use of semi-crystalline thermoplastics also provides dense parts, which may not be an advantage for some applications where high porosity for light weight parts but with a remaining part strength is preferred. In such applications, amorphous thermoplastics are preferred over semi-crystalline thermoplastics like PA 12. However, a disadvantage of amorphous thermoplastics is high viscosity, which permits coalescence only above melting point or above the glass transition temperature of the thermoplastics used.

Another disadvantage of the use of thermoplastic powder materials is that parts produce from it have only low dimensional stability at high temperature working conditions.

On the other hand, chemically crosslinked (cured) polymers, so called thermosets, have outstanding thermal and chemical properties and are irreplaceable in demanding applications, such as in structural parts needed by the aircraft and automotive industries.

Thermoset materials have been so far being utilized only in liquid form and also only in laser-stereolithography, a process that fabricates 3D objects in a bath of liquid photopolymer. This process, however, needs complicated support structures to retain the interim material produced after each printing step in the liquid bath. Due to the liquid form of the thermoset material required for this technique, the choice of material variety is limited.

US 2007/0241482 A1 relates to the production of three dimensional objects by use of electromagnetic radiation. The material system disclosed in this document and used for 3D printing comprises a granular material including a first particulate adhesive selected from the group consisting of a thermoset material and a thermoplastic material; and an absorber (fluid) capable of being heated upon exposure to electromagnetic energy sufficiently to bond the granular material. The absorber process described in this document provides a way to deliver heat to a printed layer in a 3D printer. In such a process, a dry particulate building material is treated with a liquid deposited in a cross-section of an article to be built, where the liquid engenders a solidification in the particulate build material by means of the absorber used.

The research group at Harvard University Cambridge reported on "3D-Printing of Lightweight Cellular Composites" (Adv. Mater. 2014, V 26, Issue 34, 5930-5935). The fiber reinforced composite 3D part described in this document was made of an epoxy-based ink and manufactured by 3D extrusion printing technique.

US 2014/0121327 A1 describes a process for producing a crosslinked powder using Diels-Alder reaction. A disadvantage of this Diels-Alder system is the limitation of material variety due to the specific chemistry requirements of material for Diels-Alder reaction. Another disadvantage is that the Diels-Alder reaction is thermoreversible and may not allow for applications requiring high thermostability.

In the SLS process, high power lasers, e.g. $CO_2$ and Nd:YAG, are used to sinter polymer powders in order to generate a 3D model. A $CO_2$ laser was already successfully used to completely cure thermosetting powder (Lala Abhinandan 26/SPIE Vo. 2374 & J. Laser Appl. 11, 248, 1999; Giuseppina Simane, Progress in Organic Coatings 68, 340-346, 2010). The experiments and results in these documents referred to 2D applications, not for 3D printing applications.

WO 2008/057844 A1 D1 is directed to powder compositions which include at least one polymer powder that is preferably laser sinterable, together with reinforcing particles. According to this document a laser beam selectively irritates the powder layer within the defined boundaries of the design, resulting in melting of the powder on which the laser beam falls. The control mechanism operates the laser to selectively sinter sequential powder layers, eventually producing a complete article comprising a plurality of players sintered together. The term "laser sinterable polymer powder" as used in this document is defined to refer to a powder which is capable of being melted by a laser beam of the LS (laser sintering) machine.

XP-002754724 (JP 20080107369) describes a composite material powder which can be used for the manufacture of a moulded product by selective laser sintering. The composite powder comprises spherical aggregates and a resin powder, said spherical aggregates comprising a spherical thermosetting resin curing material and spherical carbon. As an example use of phenol resin material and polyamide 12 is disclosed.

US 2004/0081573 A1 discloses a polymeric binder material comprising thermoplastics and thermoset polymers together with metal particles and metal hydride for forming a green article, after removal of unfused material from the green article it is placed in an oven or finance to decompose and drive off the binder and sinter the metal substrate particles. During printing, the powder is fused, or sinter, by the application of the laser energy that is directed to those portions of the powder corresponding to a cross section of the article. After defusing of powder in each layer, an additional layer of powder is then dispensed, and the process repeated, with fused portions of later layer fusing to fused portions of previous layers until the article is complete.

FIG. 1 is an illustration depicting interlayer-crosslinking of powder during SLS.

FIG. 2 is a drawing that depicts a crosslinking network formed by the reaction between epoxy and amine functional groups.

FIGS. 3-3B. FIG. 3 depicts the chemical structure of epoxy resin bisphenol A. FIG. 3A depicts reactions between an epoxy resin epoxy group and two different amines. FIG. 3B depicts a reaction sequence between an epoxy resin and an acid anhydride.

FIGS. 4-4C. FIG. 4 illustrates terminal functional groups of a hydroxylated polyester resin and a carboxylated polyester resin. FIG. 4A depicts a reaction between a carboxylated polyester resin and triglycidylisocyanurate (TGIC). FIG. 4B depicts a reaction between a carboxylated polyester resin and a hydroxyalkylamide. FIG. 4C depicts a reaction between a carboxylated polyester resin and a glycidylester. FIG. 4D depicts a reaction between a carboxylated polyester resin and an epoxy resin. FIG. 4E depicts a reaction between a hydroxylated polyester resin and an isocyanate adduct. FIG. 4F depicts a reaction between a hydroxylated polyester resin and the polyisocyanate polyuretdione.

FIGS. 5-5A. FIG. 5 depicts the chemical structure of glycidyl methacrylate (GMA)-acrylate resin.

FIG. 5A depicts a reaction between a GMA-acrylate resin with a dicarboxylated acid.

FIG. 6 is an image of a 3D part produced from a thermosetting powder.

FIGS. 7A-7C. Images of 3D parts produced under different conditions. FIG. 7A is an image of a 3D part produced with an energy density of 25.2 $kJ/m^2$, laser power of 16 watts, 2 scan counts, and a scanning speed of 5,000 mm/s. FIG. 7B is an image of a 3D part produced with an energy density of 31.5 $kJ/m^2$, laser power of 10 watts, 2 scan counts, and a scanning speed of 2,500 mm/s.

FIG. 7C is an image of a 3D part produced with an energy density of 31.5 $kJ/m^2$, laser power of 10 watts, 4 scan counts, and a scanning speed of 5,000 mm/s.

It is thus an object of the present invention to provide, for the rapid prototyping process, in particular for the laser sintering process, a powder material being capable of curing reactions within the SLS process to form a 3D object with good mechanical properties, adequate stability, good end use of temperature and for light weight applications. Although several polymeric powders have already been developed for the SLS technology, the existing materials typically suffered from one or more drawbacks such as, e.g. cost, ease of use, shrinkage problem, mechanical properties or stability at elevated temperature environments. Furthermore, 3D printing has been developed for thermoplastic materials but not for a 3D printing technique for a thermoset polymer powder systems where curing occurs during melting (sintering). The challenge for such a printing technique is that a thermoset polymer powder must be melted and at least partially be cured under the very short laser exposure of the SLS process, leaving free functionalities for curing/cross-linking with the next printed layer.

Thus, there is a need for the developments of a new class of SLS polymeric powder compositions, which comprise curable polymeric binder material, composites produced when using such powder compositions, especially fiber reinforced composites, and the suitable SLS processes when using such polymeric powder compositions, enabling the production of specific moldings when outstanding thermal and chemical properties as well as structural dimensional stability is required.

To surpass the disadvantages of the state of the art as mentioned above, the present invention provides for the use of a thermosetting polymeric powder composition in a Selective Laser Sintering process to produce a 3D duroplast, wherein the composition comprises at least one curable polymeric binder material and wherein during each pass of the SLS process said polymeric binder material is at least partially cured within the layer thus formed and also at least partially crosslinked with the previous layer. Such a use also enables production of moldings with high porosity but remaining part strength, light weight and durability as honeycomb structures utilized in composite materials. In the curable polymeric binder material as used according to the present invention, the heating during the SLS process results in both sintering/melting as well as at least partial chemical crosslinking of the curable polymeric binder material. The composition as used is formulated in a way that the curing reactions will occur under very short laser exposure, therefore the powder composition cures (crosslinks) at least partially already during sintering/melting. In case of pure UV curing systems also UV light is necessary for curing. The powder composition as used according to the present invention comprises mainly amorphous curable polymeric binder material resulting in cured (crosslinked) printed 3D produced by SLS process with high porosity. When this high porosity structure is additionally reinforced with short fibers, e.g. "whiskers", the objects gain mechanical properties and also show the unique lightweight properties of conventional honeycomb composite materials. The powder composition as used according to the present invention can be based on thermoset powder coating formulations already known in the state of the art, comprising curable polymeric binder powders, cross-linking (curing) agents, catalysts, accelerators, flow agents, absorbers, additives, fillers, plasticizers and pigments and can be modified to fulfill all material requirements for use in the SLS process. Objects produced with the use according to the present invention could have applications in many fields, including the automotive and aircraft industry, where lightweight materials hold a key to achieving aggressive government-mandated fuel economy standards. Further applications for lightweight and high porosity printed 3D object and parts could be for instance the surface, base, membrane and/or lining of skis.

During the melting/sintering step of the printing process, part of the laser energy is penetrating through the top layer and causes crosslinking reactions of the free functionalities left on the surface of the previously printed layer with free functionalities in the top layer and eventually also completing the inter-crosslinking within the previously printed layer, thereby improving the curing degree and also physical properties of the printed part. The laser energy density should not be too high to avoid polymer degradation, but still must be sufficient to provide for cross-linking between the printed layers and improve the curing degree of the previously printed layer. The scanned section of powder from one layer can remain partially molten (partially cross-linked) while the next layer of powder is spread over the existing one. When the laser scans this next layer and the heat affected zone reaches the full thickness of it, molten powder chemically reacts with molten powder (FIG. 1).

It is also possible to provide for free functionalities in each printed layer via the composition of the polymeric powder according to the present invention, for instance by providing an only non-stoichiometric amount of curing agent in each layer, or by way of the catalyst amount or activity, is catalysts are employed, by the particle size distribution (heat absorption for melting is depending from particle size, which means that with bigger particles only a small amount of heat is left for curing within the same laser scanning) and also by the individual thickness of each printed layer.

The powder composition of each printed layer may still not be fully cured during the laser exposure of each irradiation step.

According to a preferred embodiment of the present invention, the composition as used comprises in addition to the at least one curable polymeric binder material also at least one member of the group consisting of curing agent, catalyst, initiator, and mixtures thereof, which member is able to cure said polymeric binder material. The use of chemical crosslinking in the process according to the present invention also enables the production of high dense moldings, which are limited when using the amorphous thermoplastic systems according to the state of the art in Selective Laser Sintering. Upon application requirements, the formulation of the curable polymeric binder material as used according to the present invention can be tailor made with the right curing agents and fillers to achieve high dense moldings.

The powder composition used according to the present invention may therefore comprise a curable polymeric binder material (a) and at least one curing agent (b), where (a) and (b) are able to react with each other to form a cured network. A catalyst and/or initiator (for UV-systems) may be added, either instead of or together with the curing agent, to initiate the curing reaction or to accelerate the reaction once started, depending on the specific chemistry of the reaction.

It is also preferred that the polymeric binder material is curable by polyaddition, and/or polycondensation and/or radical polymerization. Such curing mechanisms can also include a more specific polymerization.

Furthermore, another preferred embodiment of the present invention provides that the curable polymeric binder material is selected from the group comprising compounds with at least two epoxy functional groups, compounds with at least two carboxylic acid functional groups, compounds with at least two hydroxyl functional groups, compounds derived from acrylic acid or methacrylic acid and/or mixtures thereof. The curable polymeric binder material and the curing agent can thus for instance be selected from the group consisting of epoxy with amines, amides, amino, polyphenols, acid anhydrides, multifunctional acids; epoxy with phenolic resins, epoxy with carboxylated polyester (namely hybrid systems); carboxylated polyester with hydroxyalkylamide (HAA), triglycidylisocyanurat (TGIC), glycidylester-epoxyresins (hybrids); hydroxyl-terminated polyester with polyisocyanates (blocked isocyanate or uretdione); GMA-acrylate system (epoxy functional acrylic resins cured with dicarboxylic acids), carboxyl-acrylate (carboxylated acrylic resin cured with epoxy), hydroxyl-acrylate (hydroxyl functional acrylic resins cured with blocked isocyanates); unsaturated polyesters; polyurethane/urea; isocyanate/alcohol; reactive functional polyamides, carboxylated polyamide with epoxy, thermal and/or UV radical initiators, IR or UV curable polymers and/or mixtures of two or more of said compounds and/or systems.

Generally, the thermosetting polymeric powder composition utilized according to the present invention can also be based on known powder coating chemistry with curing mechanism or combinations thereof as described in the following:

Epoxy systems (FIG. 2), such as epoxy cured with amines, epoxy cured with acid anhydrides, epoxy cured with polyisocyanates and epoxy cured with phenolic resins. In all those systems, the curing process take place by an addition reaction. In FIG. 3 as enclosed the chemical structure of bisphenol A epoxy resin, which is often used in powder coating formulation and which can also be used according to the present invention as curable polymeric binder material in a powder composition for a Selective Laser Sintering process. FIGS. 3a and 3b show the curing reactions of epoxy with typical curing agents, such as amine and acid anhydride.

Carboxylated polyester systems (FIG. 4), such as carboxylated polyester cured with triglycidylisocyanurat (TGIC) (FIG. 4a), hydroxyalkylamide (HAA) (FIG. 4b), glycidylester (FIG. 4c); carboxylated polyester cured epoxy resin, a hybrid system (FIG. 4d); hydroxyl-terminated polyester cured with polyisocyanates (blocked isocyanate or uretdione) to form a polyurethane network (FIG. 4e and FIG. 4f).

Acrylic systems such as glycidyl methacrylate (GMA-acrylic, FIG. 5) cured with polycarboxylic acid (e.g. dedecanedioic acid or acelainic acid) (FIG. 5a).

Unsaturated polyester systems where the crosslinking occurs via free radical polymerization with the use of peroxide catalyst or other thermal initiators. Also the curing via electromagnetic radiation like UV or electron beam alone or in combination with thermal initiators is possible.

Other crosslinkable materials such as vinyl ethers, bis-maleimides, polyurethane/urea; isocyanate/alcohol; reactive functional polyamides, carboxylated polyamide with epoxy, IR crosslinkable polymers etc.

To form a three-dimensional cured polymeric network, the average functionality of the curable polymeric binder material as used according to the present invention must be greater than 2. If the functionality is less than 2, no curing can occur.

According to the present invention, the curable polymeric binder material is contained in the thermosetting polymeric powder composition preferably with less than 99 wt-%, more preferably with from 10 to 70 wt-%, particularly preferably with from 20 to 60 wt-%, of the total composition.

[Catalyst] Catalyst can also be used according to the present invention. Generally, a catalyst is a compound that increases the speed of a chemical reaction without being consumed in the reaction. The addition of a suitable catalyst decrease the gelation time and can lower the bake temperature needed to achieve acceptable cure of the powder composition used according to the present invention. Catalysts are very specific to a chemical reaction and can be selected from the group comprising Lewis base (e.g. imidazole), ammonium salt, cyclic amidine, Lewis acid complex, amino-phenolic, zinc oxide, amine type, onium, dimethyl stearyl amine, stannous octoate, dibutyl tin dilaurate, dibutyl tin oxide, sulfonic acid/amine, peroxide, etc. Catalysts are typically incorporated at relatively low levels of between 0.1-2 wt-%, depending on how effective the catalyst is. However, higher concentration could also be possible.

[Initiator] Also initiators can be used according to the present invention. In contrast to a catalyst, an initiator is consumed in the reaction. The choice of a suitable initiator depends on the powder composition used according to the present invention and is within the knowledge of a person skilled in the art.

In some cases and again depending on the powder composition as used according to the present invention, a mixture of curing agent, catalyst and/or initiator may be used.

[Absorber] A sufficient capability of the curable polymeric binder material to absorb energy at present laser wavelength (e.g. for the $CO_2$ laser at 10.6 µm) is necessary for use in the SLS process. This is apparent for most polymers, as they consist of aliphatic compounds (C—H). Those polymers have, in the majority of cases, some group vibrations in the "fingerprint" infrared region sufficient to absorb relevant portions of 10.6 µm radiation. In the case of a poor absorption capability, an increase of laser energy power can compensate the effect. However, high laser power could also cause polymer decomposition, therefore in order to compensate this effect, absorbers can be added to the powder composition as used according to the present invention.

The powder composition can also comprise an absorber yielding a desired absorption at a wavelength optimal for laser curing. The absorber may for instance be adapted to absorb at the wave length of 10.6 µm specific for the $CO_2$ laser. The absorber can be blended together with the polymeric powder composition as used according to the present invention. An example of an absorber is carbon black, specifically for SLS processes using electromagnetic radiation in the IR range. While carbon black is a preferred IR absorber, other pigments such as iron oxide or quinoid rylenedicarboximides can also be used.

[Filler] The powder composition according to the present invention may also include filler materials. The particulate fillers represents from 10 to 50 wt-% of the total composition, and preferably from 20 to 30 wt-%. The filler materials may include or consist of inert fillers or active fillers and can for instance be selected from the group of carbonate-based mineral fillers, magnesium carbonate, calcium carbonate, barium sulphate, dolomite, kaolin, talc, micro-mica, alumina hydrate, wollastonite, montmorillonite, zeolite, perlite, nano fillers, pigments, such as titanium dioxide, anatase tinanium dioxide, transition metal oxides, graphite, carbon black, silica, alumina, phosphate, borate, silicate and organic fillers, such as polymer powders, like copolymers, elastomers and thermoplastics, used alone or as a mixture of two or more of these materials. Also the waste powder of powder coatings production (cured or uncured) and of the SLS process according to the invention could be used as fillers depending on the product requirements.

[Flow agent] In order to improve melt flow during production of the moldings, a flow agent can be added to the thermosetting polymeric powder composition used according to the present invention. Preferably this flow agent is of substantially spherical shape. The flow agent can for instance be an inorganic powdered substance having a particle size of less than 20 microns, preferably less than 10 microns, selected from the group consisting of hydrated silicas, amorphous alumina, glassy silicas, glassy phosphates, glassy borates, glassy oxides, titania, talc, mica, fumed silicas, kaolin, attapulgite, calcium silicates, alumina, magnesium silicates and/or mixtures thereof. The flow agent is present only in an amount sufficient to cause the resin powder to flow and level during the layer by layer process employed in the SLS process. It is preferred that the thermosetting polymeric powder composition used according to the present invention comprises less than 5 wt-%, more preferably from 0.05 to 2 wt-%, particularly preferably from 0.05 to 1 wt-% of the total composition.

The thermosetting polymeric powder composition used according to the present invention preferably comprises at least one amorphous polymer binder, and maybe one or more (semi-) crystalline polymer powder binder, preferably from 0 to 49 wt-% of the total binder content, as an option, preferably together with other additives to adjust the melt viscosity of the system. Amorphous polymer binders are able to produce parts with very good dimensional accuracy, feature resolution and surface finish, depending on the grain size of the powder.

[Particle grain size] largely affects the precision and density of the SLS process. A smaller particle size is favorable for building a higher precision SLS molding. On the other hand, a too small particle size of the polymeric powder composition will make it difficult to spread the powder because it causes the powder to self-reunite. Considering the cost of milling, the precision and the density of SLS moldings, and the difficulty of spreading powder, a main particle size of the thermosetting polymeric powder composition of 20-100 µm, more preferably 40-80 µm is preferred.

The production process of the thermosetting polymeric powder composition used according to the present invention, mainly the milling process, requires resin (polymeric binder material) components with rather high softening temperatures. The glass transition temperatures of all polymeric materials used according to the present invention should preferably be above 40° C., otherwise the materials would fuse during the milling process or would need cryogenic milling. Selection of the polymeric binder material for the invented powder composition is preferably restricted by this condition. This property generally results in a relatively hard (brittle) cured polymer so that it is necessary to cure the polymeric binder material effectively, in order to balance and provide for flexibility of the produced molding to optimum levels.

The particles of the thermosetting polymeric powder composition used according to the present invention are not allowed to agglomerate. The finer the particles are, the higher the effects of surface energy are. If the particles are very fine, some agglomerated amounts are no longer able to be fluidized. That results in forming specks and leveling defects in films produced.

The number average molecular weight of the polymeric binder material used according to the present invention is preferably in the range of 1,000 to 15,000 Dalton, more preferably in the range of 1,500 to 7,500 Dalton. Mechanical properties of the curable polymeric binder material, such as flexibility and impact strength, are mostly dependent on the number average molecular weight ($M_n$), while viscosity is a function of the weight average molecular weight ($M_w$). To maximize the physical properties and retain a low melt viscosity, the polydispersity ($M_w/M_n$) should approach unity. The molecular weight of the curable polymeric binder material used according to the present invention will influence the $T_g$ of the binder material. As already mentioned, the $T_g$ of the polymeric binder material used according to the present invention should be at least 40° C., preferably higher. The $T_g$ must be high enough to resist sintering and agglomeration during—maybe cooled—storage and shipping of the powder, but low enough to promote maximum flow and leveling.

Preferably, in order to support fluidization of the thermosetting polymeric powder composition used according to the present invention, additives are at it and/or, for example, the particle surfaces of the powder composition are covered with nano-particles. The composition used for SLS should have low melt viscosity, therefore polymeric ingredients of the powder composition used according to the present invention are preferably selected not only to have relatively high glass transition temperatures of above 40° C., but also to have low average molecular masses. Crystalline polymers can be added to the composition to optimize the melt viscosity because they have relatively sharp melting temperature and low melt viscosity.

The powder compositions used according to the present invention have only a short time after melting to coalesce and flow before cross-linking starts. Therefore, the melt viscosity, functionality and reaction rate of the polymeric binder material must be carefully controlled.

In the SLS process, the part bed is first pre-heated by the heating system to a temperature referred to as part bed temperature ($T_b$). Part distortion and laser power can be decreased by operating $T_b$ at the highest temperature possible, but not above the softening temperature points ($T_s$) of the polymers contained in the powder composition as used, otherwise polymer powders will stick together and be not freely flowable.

Amorphous polymers, as they are preferably be used in the present invention as curable polymeric binder material, exhibit a glass transition temperature ($T_g$) below which they are solid. Depending on their particle size and molecular weight, amorphous polymers are during the SLS process preheated to a temperature near $T_g$ and will then melt if the temperature further rises above $T_g$. Above $T_g$, amorphous polymers become first leathery or rubbery and then liquid. Therefore, $T_s$ of amorphous polymer is $T_g$. The brittleness temperature $T_b$ should be kept close to $T_g$ but not beyond $T_g$, otherwise the particles of amorphous polymer powders will stick together and distributing the powder will become difficult. Therefore, $T_b$ is set closely above $T_g$, which can be obtained from its DSC curves.

In the SLS process, laser radiation, in particular $CO_2$ laser light with a wavelength of about 10.6 µm, is used to selectively sinter/melt the thermosetting polymeric powder composition, thereby converting the layer into a liquid phase. Under the heat produced by laser absorption, also the curing (crosslinking) reactions occur within the selected area, thus providing for an at least partial curing/cross-linking of this layer, curing/crosslinking this layer with/to the previously printed layer, and leaving free functionalities in this layer for enabling curing/cross-linking of this layer with the next printed layer. Locally, full coalescence of the particles in the top powder layer is necessary, as well as adhesion (via curing/crosslinking reactions) with previously printed layers. Such localized curing can be optimized by carefully chosen processing conditions, thermoconductivity of the sample and the mixture of reactants. Preferably, a scanning system along with a preferably automated control of laser parameters is used, including control of laser power, pulse repetition rate, scanning frequency, scanning speed and size of laser beam. Regarding the powder material according to the present invention used, the degree of curing (cross-linking) during formation of each layer can be for example controlled by the amount of curing agent present in the material, the resin to hardener ratio, the amount of catalyst, if any, present, the particle size distribution PSD as well as by the thickness of each printed layer. Providing for only a partial curing (cross-linking) when printing one layer leaves free functionalities, thus enabling curing/cross-linking of this layer with the immediately previously printed layer as well as with the next printed layer.

During each step of the SLS process, the mixture of the powdered thermosetting polymeric powder composition is applied to the target area in a range of thickness of preferably from 100 to 200 µm, more preferably 100 µm. Once the powder layer is leveled to form a smooth surface, it is exposed to radiation from a typically 50 watt (up to 200 watt) $CO_2$ laser with a wavelength of preferably 10.6 µm. The focused beam diameter is preferably between 400 to 700 µm to confine the heating of sample to a reasonably small region. When the energy of the laser is kept constant at eg. 50 watts, the intensity of the exposure can be controlled by varying the scan rate, which can be adjusted from 0 mm/s up to 12,000 mm/s, and which preferable is set between 2,000 to 6,000 mm/s at laser intensities in the rage of 100 to 800 J/cm³.

If the laser is scanned too quickly over the sample, curing may not be achieved at all because any one spot does not absorb sufficient energy to initiate curing. The other extreme is when the scanning speed too low, then the spot would be overheated and the deposited energy would spread outward from the irradiated area, thus curing a greater area than desired. It is within the knowledge of a person skilled in the art to choose from the above mentioned parameter in a way to provide for a suitable degree of curing during formation of each layer as well as to leave free functionalities within the layer for curing/cross-linking with the next layer.

When working with a material which does not absorb the laser energy as strongly, the absorption depth may exceed the depth of focus of the laser beam. For this case, it is likely that the depth of focus will be the factor which most determines the confinement of laser energy in the direction normal to the sample surface. Beyond the depth of focus, the laser energy would decrease sufficiently that curing would no longer be induced.

The laser spacing (hatch spacing) is usually less than the laser beam diameter. Cross-section of the molding may not be sintered if the laser spacing is too far, presently the laser spacing is normally in the range between 200 and 300 μm and preferred to be 200 μm. Each pass of laser causes the thermosetting polymeric powder composition to fuse and to initiate curing. With each successive pass of the laser beam, the film then formed is also first fused, simultaneously curing is initiated within the film, and additionally the film is also crosslinked with the film formed during the previous pass. This process is repeated layer by layer until the desired 3D-object is completed.

In some cases, the thermosetting polymeric powder composition described herein can be used to print, e.g. 3D fiber reinforced composite components for aircraft or automotive industries and any 3D sport tools requiring high porosity and light weight, especially for skis. The use of the thermosetting polymeric powder composition described above provides 3D articles having thermal stability since they are cured and crosslinked duroplasts and not meltable as 3D articles made of thermoplast.

EXAMPLES

Example 1

The mixture was composed of 600 parts of Uralac® P3490 (DSM), a saturated carboxylated polyester resin, 45 parts of Araldite® PT-910 (Huntsman), 320 parts of Titanium dioxide (Kronos® 2160, Kronos Titan GmbH), 15 parts of Resiflow PV 5 (Worlée-Chemie GmbH), 8 parts of Accelerator DT-3126 (Huntsman) and 7 parts of Benzoin. All components were premixed in a high-speed mixer for 1 min and then extruded in a twin-screw ZSK-18 extruder at a screw speed of 400 rpm with a rear-zone temperature of 80° C. and a front-zone temperature of 90° C. In an alternative setting of the extruder, a temperature gradient of 40 to 100° C. and a cooling device for the feeding area was used. The compound obtained was then cooled down, granulated and fine ground to obtain a powder having a D50 of less than 80 μm. The powder can be used in a SLS laser sintering 3D-printing machine.

Example 2

The mixture was composed of 600 parts of Uralac® P3490, 45 parts of Araldite® PT-910 (Huntsman), 15 parts of Resiflow PV 5 (Worlée-Chemie GmbH), 8 parts of Accelerator DT-3126 (Huntsman), 7 parts of Benzoin and 10 parts of short carbon fibers. The carbon fibers used had an average length of 60 μm and can be obtained under the product designation Tenax®-A HAT M100 (Toho Tenax Europe GmbH). All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a SLS laser sintering 3D-printing machine.

Example 3

The mixture was composed of 500 parts Uralac® P 1580 (DSM), a saturated OH-polyester resin, 215 parts of Vestagon® B 1530 (Evonik), 15 parts of Resiflow PV 5 (Worlée-Chemie GmbH) and 7 parts of Benzoin. All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a SLS laser sintering 3D-printing machine.

Example 4

The mixture was composed of 790 parts Uralac® P 6401 (DSM), a saturated carboxylated polyester resin, 60 parts of TGIC (Huntsmann), 15 parts of Resiflow PV 5 (Worlée-Chemie GmbH), 5 parts of Benzoin and 350 parts of Titanium dioxide (Kronos® 2160, Kronos Titan GmbH). All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a SLS laser sintering 3D-printing machine.

Example 5

The mixture was composed of 350 parts of Uralac® P 3450 (DSM), a saturated carboxylated polyester resin, 150 parts of Araldite® GT 7004 (Huntsmann), 7 parts of Resiflow PV 5 (Worlée-Chemie GmbH), 4 parts of Benzoin and 230 parts of Titanium dioxide (Kronos® 2160, Kronos Titan GmbH). All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, a temperature gradient of 40 to 100° C. and a cooling device for the feeding area was used. The compound obtained was then cooled down, granulated and fine ground to obtain a powder having a D50 of less than 100 μm. The powder can be used in a SLS laser sintering 3D-printing machine.

Example 6

The mixture was composed of 350 parts of UVECOAT 2100 (Allnex), an unsaturated polyester resin, 13 parts of photo initiators, 6 parts of MODAFLOW® Powder 6000, 2 parts of Benzoin. All components were premixed in a high-speed mixer for 1 min and then extruded in a twin-screw ZSK-18 extruder at a screw speed of 400 rpm with a rear-zone temperature of 90° C. and a front-zone temperature of 100° C. In an alternative setting of the extruder, zone temperatures of 40/60/80/100/90° C. and a cooling device for the feeding area was used. The compound obtained was then cooled down, granulated and fine ground to obtain a powder having a D50 of less than 80 μm. The powder can be used in a SLS laser sintering 3D-printing machine.

Example 7

The mixture was composed of 440 parts of Crylcoat 1506-6 (Allnex), a saturated polyester resin, 290 parts of Araldite® GT7220 (Huntsman), 25 parts of Reafree 04705-10 (Arkema), 10 parts of Eutomer B31 (Eutec Chemical), 15 parts of Powderadd 9083 (Lubrizol), 2 parts of Tinuvin 144 (BASF), 230 parts of Titan Tiona RCL 696 (Cristal). All components were premixed in a high-speed mixer for 1 min and then extruded in a twin-screw ZSK-18 extruder at a screw speed of 600 rpm with zone temperatures of 40/60/80/100/90° C. and a cooling device for the feeding area. The compound obtained was then cooled down, granulated and fine ground to obtain a powder having a D50 of less than 100 µm. The powder can be used in a SLS laser sintering 3D-printing machine.

Example for the SLS Process: Production of the Thermosetting 3D Parts

The powders of examples 1-7 were used to produce 3D articles (FIG. 6) using a SLS process as following: Each of the powder of examples 1-7 was applied to the build surface stage in a DTM Sinterstation 2000 (DTM Corporation, Austin, Tex., USA). During each step of the SLS process, the powder of examples 1-6 were applied to the target area in a range of thickness of 100 µm. Once the powder layer has been leveled to form a smooth surface, it was exposed to radiation from a 10-30 W $CO_2$ laser with a wavelength of 10.6 µm at a scanning speed of about 2,500 to 5,000 mm/s, 2 to 4 scan counts and with a scan spacing of between 0.2 and 0.3 mm. The powder had a sufficient to good flowability, resulting in a smooth and levelled powder bed, where the part bed temperature was in the range from 50° C. to 80° C.; no curling occurred in this range.

The energy input required for the production of parts was between 10 and 40 W. The parts sintered at the highest energy input indicate satisfactory properties after SLS processing. As already mentioned, by varying the energy input the curing degree can be varied.

FIG. 7 demonstrates the results of printing 3 identical 3D parts under use of the powder composition according to the present invention, the parts having a total built height of 5.76 mm and being produced with the above-mentioned SLS DTM Sinterstation 2000 using three different process parameters:
 (a) the part was produced with an energy density of 25.2 kJ/m$^2$, laser power 16 W, 2 scan counts, scanning speed 5,000 mm/s,
 (b) the part was produced with a higher energy density of 31.5 kJ/m$^2$, laser power 10 W, 2 scan counts, scanning speed 2,500 mm/s and
 (c) the part was produced with an energy density of also 31.5 kJ/m$^2$, laser power 10 W, but 4 scan counts, scanning speed 5,000 mm/s.

The parts thus built were strong enough to be sandblasted though, which allowed for easy removal of powder. Most delicate features survived. Parts (b) and (c) show better result with slits and holes being open, which is a key indicator for good part resolution. Increasing lateral growth in Z direction was observed. The surface of the part sintered at 2 scan counts×10 W at a low scanning speed 2,500 mm/s (b) was smoother and showed less errors than the part sintered at 4 scan counts×10 W at a high scanning speed 5,000 mm/s (c). The edges of the parts were quite round rather than sharp. With higher energy density obtained from process conditions of (b) and (c) the curing degree of the parts produced after SLS process reached about 47% while (a) reached only about 21% of curing degree calculated from DSC experiments.

It can be seen that by controlling the degree of curing (cross-linking) during formation of each layer only a partial curing (cross-linking) when printing one layer can be provided, which leaves free functionalities. Such free functionalities then enable a curing/cross-linking of this layer with the immediately previously printed layer and, once the next layer is printed, with this next printed layer.

The invention claimed is:

1. A method of producing a 3D duroplast, the method comprising using a thermosetting polymeric powder composition in a Selective Laser Sintering (SLS) process, wherein the composition comprises at least one curable polymeric binder material and wherein during each pass of the SLS process said polymeric binder material is at least partially cured within the layer thus formed and also at least partially crosslinked with the previous layer.

2. The method of claim 1, wherein the composition comprises at least one curable polymeric binder material together with at least one member of the group consisting curing agent, catalyst, initiator, and mixtures thereof, which member is able to cure said polymeric binder material.

3. The method of claim 1, wherein the polymeric binder material is curable by polyaddition, and/or polycondensation and/or radical polymerization.

4. The method of claim 1, wherein the curable polymeric binder material is selected from the group comprising compounds with at least two epoxy functional groups, compounds with at least two carboxylic acid functional groups, compounds with at least two hydroxyl functional groups, compounds derived from acrylic acid or methacrylic acid and/or mixtures thereof.

5. The method of claim 1, wherein the curable polymeric binder material is contained in the thermosetting polymeric powder composition with less than 99 wt-% of the total composition.

6. The method of claim 5, wherein the curable polymeric binder material is contained in the thermosetting polymeric power composition with from 10 to 70 wt-% of the total composition.

7. The method of claim 6, wherein the curable polymeric binder material is contained in the thermosetting polymeric power composition with from 20 to 60 wt-% of the total composition.

8. The method of claim 1, wherein the curable polymeric binder material is mainly an amorphous polymer binder.

9. The method of claim 1, wherein the thermosetting polymeric powder composition has a particle size of 1 to 250 µm.

10. The method of claim 9, wherein the thermosetting polymeric powder composition has a particle size from 20 to 100 µm.

11. The method of claim 10, wherein the thermosetting polymeric powder composition has a particle size from 40 to 80 µm.

12. The method of claim 1, wherein the glass transition temperatures of all polymeric materials present in the thermosetting polymeric powder composition is at least 40° C.

13. The method of claim 12, wherein the glass transition temperatures of all polymeric materials present in the thermosetting polymeric powder composition is greater than 40° C.

14. The method of claim 1, wherein the number average molecular weight of the polymeric binder material is in the range of 1,000 to 15,000 D.

15. The method of claim 14, wherein the number average molecular weight of the polymeric binder material is in the range of 1,500 to 7,500 Dalton.

16. A 3D duroplast produced by a Selective Laser Sintering (SLS) process comprising the steps of:

providing a thermosetting polymeric powder composition comprising at least one curable polymeric binder material;

sintering the composition such that the polymeric binder material is at least partially cured within a layer thus formed and at least partially crosslinked with a previously printed layer;

wherein the at least partial curing of the polymeric binder material leaves free functionalities for curing and/or crosslinking with a subsequent printed layer.

17. A 3D-printing product produced using the thermosetting polymeric powder composition of claim 1.

* * * * *